US011443216B2

(12) United States Patent
McCawley et al.

(10) Patent No.: US 11,443,216 B2
(45) Date of Patent: Sep. 13, 2022

(54) CORPUS GAP PROBABILITY MODELING

(71) Applicant: International Business Machines Corporation, Armonk, NY (US)

(72) Inventors: Michael McCawley, Groton, MA (US); Adriana Valido, Miami, FL (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 16/262,479

(22) Filed: Jan. 30, 2019

(65) Prior Publication Data

US 2020/0242494 A1 Jul. 30, 2020

(51) Int. Cl.
| | |
|---|---|
| *G06N 5/04* | (2006.01) |
| *G06F 16/36* | (2019.01) |
| *G06F 16/35* | (2019.01) |
| *G06N 20/00* | (2019.01) |
| *G06F 16/93* | (2019.01) |
| *G06F 40/30* | (2020.01) |

(52) U.S. Cl.
CPC ............ *G06N 5/048* (2013.01); *G06F 16/35* (2019.01); *G06F 16/36* (2019.01); *G06F 16/93* (2019.01); *G06F 40/30* (2020.01); *G06N 20/00* (2019.01)

(58) Field of Classification Search
CPC ........ G06N 5/048; G06N 20/00; G06F 16/93; G06F 16/35; G06F 16/36; G06F 40/30

USPC .......................................................... 706/12
See application file for complete search history.

(56) References Cited

U.S. PATENT DOCUMENTS

| | | | |
|---|---|---|---|
| 7,613,601 B2 | 11/2009 | Murata et al. | |
| 9,135,242 B1 | 9/2015 | Wang et al. | |
| 9,535,910 B2 | 1/2017 | Allen et al. | |
| 2014/0120513 A1 | 5/2014 | Jenkins et al. | |
| 2015/0339299 A1* | 11/2015 | Bagchi .................. | G06N 3/006 707/728 |
| 2019/0205761 A1* | 7/2019 | Wu ......................... | G06N 3/04 |

OTHER PUBLICATIONS

Blei, David M., et al., "Latent Dirichlet Allocation", Journal of Machine Learning Research, vol. 3, Mar. 1, 2003, pp. 993-1022.
Andrade, Daniel, et al., "Learning the optimal use of dependency-parsing information for finding translations with comparable corpora," Proceeding of the 4th Workshop on Building and Using Comparable Corpora: Comparable Corpora and the Web, Jun. 24, 2011, pp. 10-18.

(Continued)

*Primary Examiner* — Hope C Sheffield
(74) *Attorney, Agent, or Firm* — Lieberman & Brandsdorfer, LLC

(57) ABSTRACT

A system, computer program product, and method are provided to conduct gap probability mapping to predict presence and location of one or more gaps in a corpus. A probabilistic model is formed to represent inter-corpora associations of objects, which the model leverages to process query submissions. As queries are received and processed, the model creates an adjustment. Subject to evaluation, confidence of the adjustment is evaluated, and a response correlated to the confidence is returned.

15 Claims, 8 Drawing Sheets

(56) References Cited

OTHER PUBLICATIONS

Wu, Wentao, et al., "Probase: a probabilistic taxonomy for text understanding," SIGMOD '12 Proceedings of the 2012 ACM SIGMOD International Conference on Management of Data, May 20-24, 2012, pp. 481-492.

Peterson, Erich A., et al., "Mining probabilistic generalized frequent item sets in uncertain databases," ACMSE '13 Proceedings of the 51st ACM Southeast Conference, Article No. 1, Apr. 4-6, 2013, pp. 1-6.

Anonymous, "System and method to improve accuracy, confidence, evidence, relevant and expected answers based on the context of the question asker," IP.COM, Disclosure No. IPCOM000238560D, Sep. 3, 2014.

* cited by examiner

CORPUS GAP PROBABILITY MODELING

BACKGROUND

The present embodiment(s) relate to machine learning and probabilistic measurement. More specifically, the embodiment(s) relate to spatial ontology and assessment of relevancy across domains, and identification of inherently relevant data responsive to the relevancy assessment.

In the field of artificial intelligent computer systems, natural language systems (such as the IBM Watson® artificial intelligent computer system and other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning or new training data that is incorrect.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

It is understood that with respect to AI, data is subject to processing, and is essentially driven from static structures. These static structures dictate a determined output or action for a given determinate input. More specifically, the determined output or action is based on an express relationship within the static structure. This arrangement may be satisfactory for select circumstances and conditions. However, it is understood that within the data there may be undefined or undiscovered relationships, that if discovered may dictate or identify an undetermined output.

SUMMARY

The embodiments include a system, computer program product, and method for evaluating activities to probabilistically ascertain one or more gaps in a knowledge base.

In one aspect, a system is provided with a processing unit operatively coupled to memory, with an artificial intelligence platform in communication with the processing unit and memory. A knowledge engine, which is in communication with the processing unit, is provided to assess probability with respect to presence of a gap, and to generate a corresponding map. The knowledge engine is provided with tools to support the assessment, identification, and map generation. These tools include an organization manager, a query manager, a director, and a machine learning manager. The organization manager organizes objects into a taxonomy and conducts analysis of corpora to form a probabilistic model of inter-corpora association of objects. The query manager functions to receive and process queries, and more specifically to identify a taxonomy and corpus associated with query context. Processing of the query yields an initial probability, which the query manager applies to the model to form an adjusted probability. The director functions to assess accuracy of a query response based on the initial and adjusted probability value. A response correlated to the assessed confidence is generated and returned.

In another aspect, a computer program product is provided to conduct corpus gap probability mapping. The computer program product includes a computer readable storage device having embodied program code that is executable by a processing unit. Program code is provided to assess probability with respect to presence of a gap in the knowledge base, and to generate a corresponding map. Program code organizes objects into a taxonomy and conducts analysis of corpora to form a probabilistic model of inter-corpora association of objects. In addition, program code is provided to receive and process queries, and more specifically to identify a taxonomy and corpus associated with query context. Processing of the query yields an initial probability. Program code applies to the model to form an adjusted probability and assesses accuracy of a query response based on the initial and adjusted probability value. A response correlated to the assessed confidence is generated and returned.

In yet another aspect, a method is provided for conducting corpus gap probability mapping. Probability is assessed with respect to presence of a gap in the knowledge base, and a corresponding map is generated. Objects are organized into a taxonomy and an analysis of a corpora is conducted to form a probabilistic model of inter-corpora association of objects. Queries are received and processed and a taxonomy and corpus associated with query context is identified. Processing of the query yields an initial probability. A model is applied to form an adjusted probability and assesses accuracy of a query response based on the initial and adjusted probability value, and a response correlated to the assessed confidence is generated and returned.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
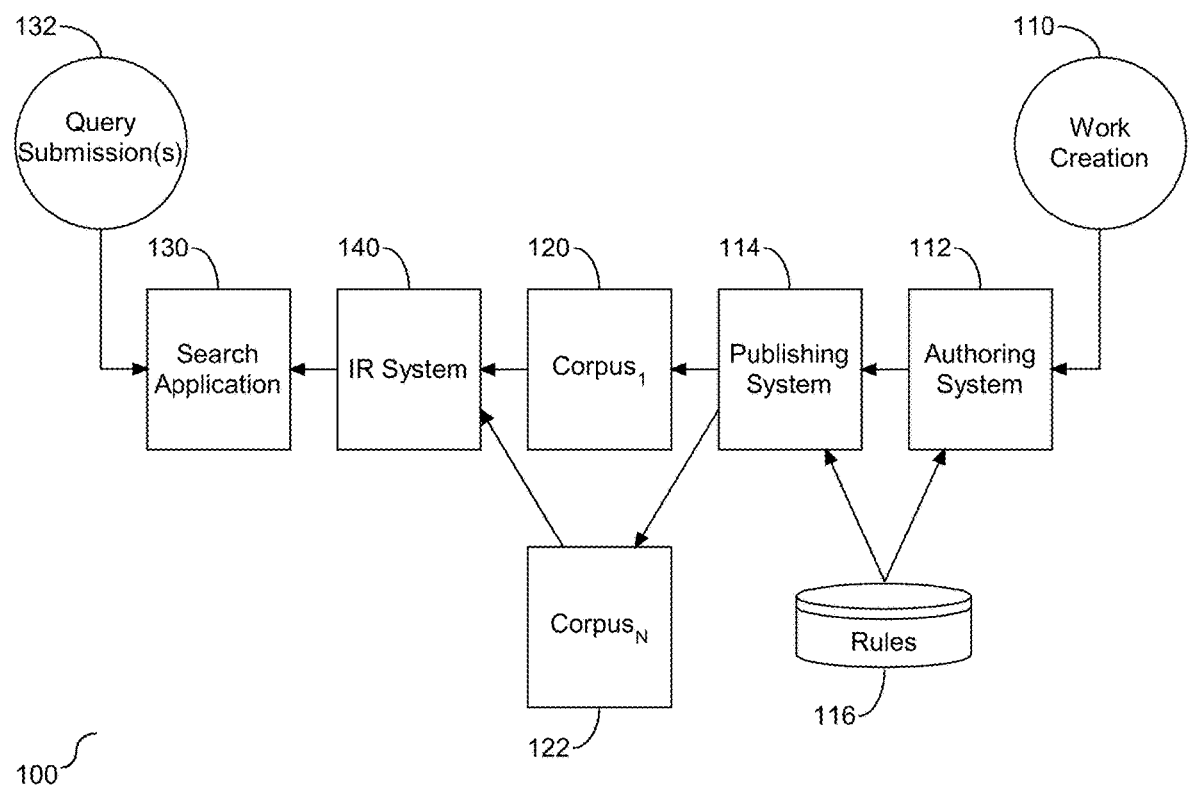
FIG. 1 depicts a prior art flow chart demonstrating a relationship between authorship of works and submission of queries.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Ontology is an organizational system designed to categorize and help explain relationships between various concepts in the same area of knowledge and research. The ontology functions as a structural framework to organize information and concepts. It is understood that the categorization present in any ontology is expressly defined, and as such is apparent. However, it is understood that there may be inherent or non-expressly defined relationships within the ontology, e.g. intra-ontology, or across two or more ontologies, e.g. inter-ontology. Accordingly, as shown and described herein, natural language understanding (NLU) and machine learning (ML) are utilized to process queries, analyze associated data, and capture inherent data and associated data relationships across one or more ontologies.

Natural language understanding (NLU) is a subset of natural language processing (NLP). NLU uses algorithms to transform speech into a structured ontology. In one embodiment, the ontology is constructed from the taxonomy of NLU output. NLU provides the definitions required to construct the ontology in terms of classes, subclasses, domain, range, data properties, and object properties. Ontology individuals are mapped to objects. Processing the same or similar documents provides the data required to build the ontology, also referred to as the initial ontology. The ontology is defined by the ML Model (MLM) being applied to a data store; the ontology is constructed using output of an associated NLP service. More specifically, the ontology is generated with facts or mentions that the MLM has generated. The facts or mentions make up the object fields of the ontology. In one embodiment, the ontology is in the form of a data structure, or in one embodiment, a knowledge graph (KG) with the facts or mentions represented as nodes in the graph. The structure of the ontology may be kept constant, while allowing information to be added or removed into existing fields or nodes. Similarly, the structure of the ontology may be dynamic with addition or removal of fields or nodes as context is subject to evaluation or development. The ontology may be used to create new and retrain existing MLMs. In one embodiment, when the KG is modified, new entities and relationships are realized and employed to automate training of the MLM; the MLM becomes dynamic and progressive. Accordingly, the ontology as represented by the KG and the MLM are inter-related.

A knowledge base is a repository of information. In relation to information technology (IT), a knowledge base is a machine-readable resource for the dissemination of information. As an integral component of knowledge management systems, the knowledge base is used to optimize information collection, organization, and retrieval. It is understood that gaps are or may be present in the knowledge base. The aspect of closing such gaps may be entailed by creating net new knowledge instead of creating duplicate or near-duplicate content. However, the challenge is identifying where these gaps in the knowledge exist, e.g. locating these gaps. As shown and described below, probabilistic predictions are utilized to identify the presence of these gaps in a corresponding subject matter corpus by understanding frequencies of activities that reveal relative importance.

The knowledge base is considered in the context of information retrieval science as a set of tuples, or in one embodiment answers paired with questions. In one embodiment, these tuples are referred to as question-answer pairs. The question space, Q, is the set of all possible questions that can be formulated in a domain of knowledge. It is understood that under this definition of the question space, the set of questions is large, and in one embodiment not practical. Rather than consider the entirety of the question space, the practical application is to address a subset of the question space, referred to herein as Q' and defined as questions within question space Q that are asked.

Revealing an actual gap in knowledge is challenging because these systems are complex. Simply querying the knowledge base is valuable, but at the same time is also limited. Referring to FIG. 1, a prior art flow chart (100) is provided to demonstrate the relationship between authorship of works and submission of queries. As shown, authors create works (110) and submit their works to an authoring system (112), which presents the authored works to a publishing system (114). Both the authoring system (112) and the published system (114) are subject to rules (116). Once published, the works of authorship are stored in one or more libraries, referred to herein as $corpus_1$ (120) and $corpus_N$ (122). Although shown herein as two separate corpi, the quantity should not be considered limiting. It is understood that a search application (130) supports query submissions (132). An information retrieval system (140) functions as an interface between the search application(s) and the corpi (120) and (122). The information retrieval system (140) processes questions presented to the search application (130), and uses the corpi (120) and (122) to search for answers in support of the question(s).

It is understood that the information retrieval system (140) may not find an answer or an appropriate answer to the question(s) being processed. The failure to find one or more answers may be attributable to many causes. One cause may be a deficiency in a corresponding information retrieval engine. For example, the knowledge, e.g. answer(s), may exist, but cannot be returned from the query processing because a corresponding search engine is not able to isolate the correct knowledge because of issues associated with retrieval. Another cause may be a deficiency associated with content publication. For example, the knowledge, e.g. answer(s), may exist, but the system that stores the knowledge has not correctly inserted the knowledge into the corpus with correct metadata, taxonomy values, or other attributes on which the retrieval depends. Another cause may be the absence of the content, in which no knowledge exists to support a response to the query, thereby indicating a gap in coverage.

One apparent challenge is directed at isolating the cause of a failure to find answers or appropriate answers to support query submission. It is understood that information in a corpus is classified by taxonomies of values and corresponding attributes. By successively slicing content into segments, the size of each segment can be known or defined. At the same time, actions that take place in a system or knowledge base have corresponding attributes. Random actions add little or no value. However, those skilled in a particular area generally perform actions aligned with skills and as such do not act randomly. These skills, or in one embodiment preferences, may be leveraged to join data sets.

Figure 2:
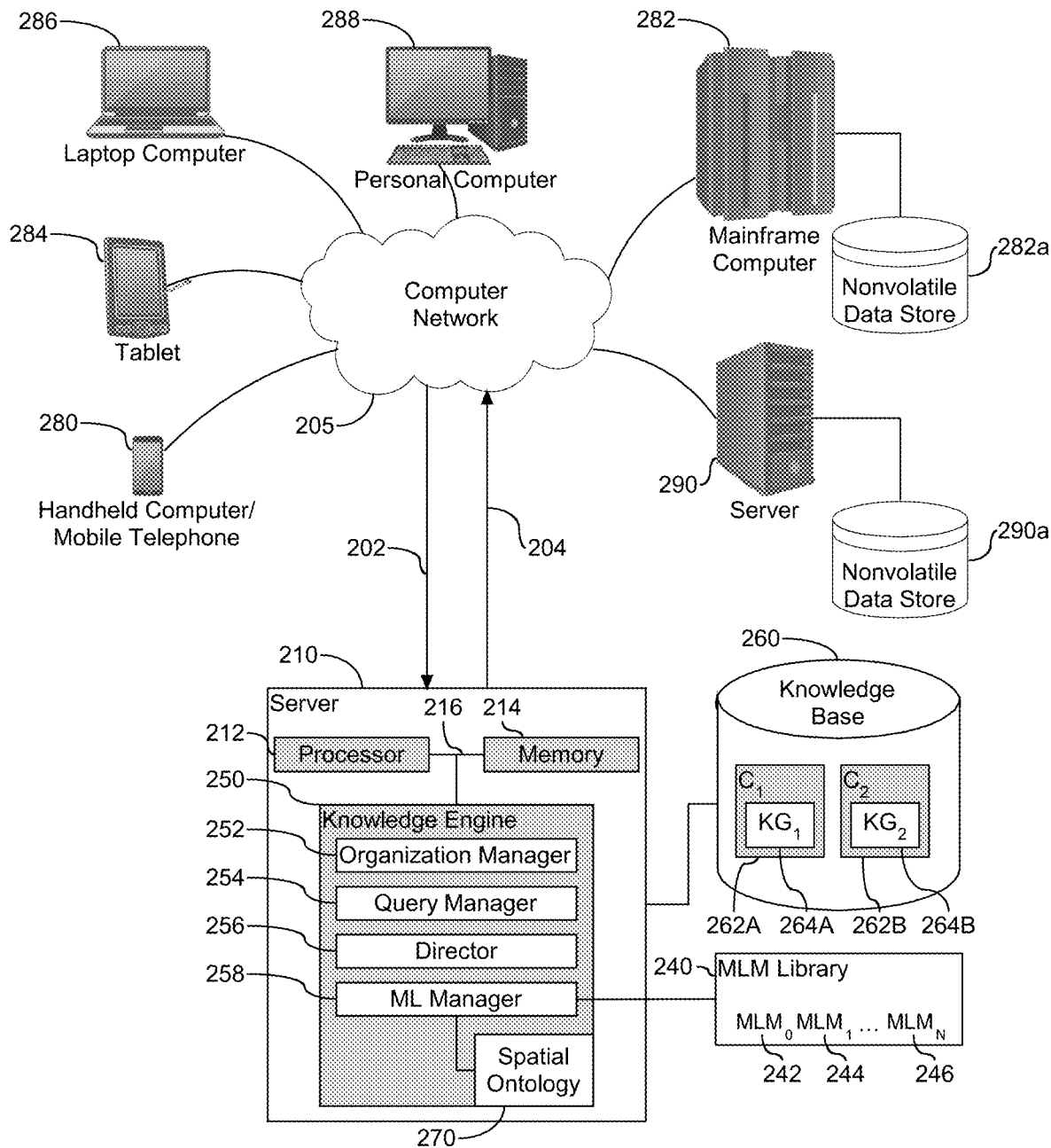
FIG. 2 depicts a schematic diagram of an artificial intelligence platform to resolve knowledge gap identification and resolution.

Referring to FIG. 2, a schematic diagram of an artificial intelligence platform (200) is depicted to resolve knowledge gap identification and resolution. As shown, a server (210) is provided in communication with a plurality of computing devices (280), (282), (284), (286), and (288) across a network connection (205). The server (210) is configured with a processing unit (212) operatively coupled to memory (214) across a bus (216). A tool in the form of a knowledge engine (250) is shown local to the server (210), and operatively coupled to the processing unit (212) and/or memory (214). As shown, the knowledge engine (250) contains one or more tools (252), (254), (256), and (258). The tools (252), (254), (256), and (258) provide the artificial intelligence platform and associated processing over the network (205) from one or more of the computing devices (280), (282), (284), (286) and (288). More specifically, the tools (252) (254), (256), and (258) support and enable evaluation of data on an inter-ontology basis to identify inherently relevant data. The computing devices (280), (282), (284), (286), and (288) communicate with each other and with other devices or components via one or more wires and/or wireless data communication links, where each communication link may comprise one or more of wires, routers, switches, transmitters, receivers, or the like. In this networked arrangement, the server (210) and the network connection (205) may enable natural language processing and resolution for one or more content users. Other embodiments of the server (210) may be used with components, systems, sub-systems, and/or devices other than those that are depicted herein.

The tools, including the knowledge engine (250), or in one embodiment, the tools embedded therein including an organization manager (252), a query manager (254), a director (256), and a machine learning (ML) manager (258) may be configured to receive input from various sources, including but not limited to input from the network (205), and one or more corpora or libraries (262A) and (262B) from a knowledge base (260). In addition, a library of one or more machine learning models (MLMs) (240) are shown operatively coupled to the ML manager (258) to support dynamic build of spatial inter-corpora ontology. The knowledge base (260) is shown with two corpora, referred to herein as $C_1$ (262A) and $C_2$ (262B). Although only two corpora are shown, this is for illustrative purposes only and the quantity should not be considered limiting. For example, the knowledge base (260) may include $C_N$ (not shown). Each of the corpora has an associated ontology, shown and described herein in the form of a knowledge graph. More specifically, corpora $C_1$ (262A) is shown with an associated knowledge graph, $KG_1$, (264A) and corpora $C_2$ (262B) is shown with an associated knowledge graph, $KG_2$, (264B). In one embodiment, the knowledge graphs may be organized to form a library of ontologies. Each KG is a representation of the ontology of the associated corpora. More specifically, $KG_1$ (264A) and $KG_2$ (264B) include a plurality of related subjects and objects. In one embodiment, related KGs are stored in an associated KG container, with the knowledge base (260) storing one or more KG containers. In one embodiment, KGs may also be acquired from other sources, and as such, the data store depicted should not be considered limiting.

The various computing devices (280), (282), (284), (286), and (288) in communication with the network (205) demonstrate access points for content creators and content users. Some of the computing devices may include devices for a database storing the corpus of data as a body of information used by the knowledge engine (250), and in one embodiment the tools (252), (254), (256), and (258), to embed deterministic behavior into the system. The network (205) may include local network connections and remote connections in various embodiments, such that the knowledge engine (250) and the embedded tools (252), (254), (256), and (258) may operate in environments of any size, including local and global, e.g. the Internet. Additionally, the server (210) and the knowledge engine (250) serve as a front-end system that can make available a variety of knowledge extracted from or represented in documents, network accessible sources and/or structured data sources. In this manner, some processes populate the server (210), with the server (210) also including input interfaces to receive requests and respond accordingly. Content creators and content users may also be available in data repositories, such as, but not limited to, (260), and the list of demonstrated access points here should not be considered limiting.

As shown, the knowledge base (260) is operatively coupled to the server (210). The knowledge base (260) includes one or more corpora, shown herein as (262A) and (262B) with each corpora having one or more ontological structures, e.g. KGs, shown herein as (264A) and (264B). Content users may access the system via API administration or orchestration platforms, as shown and described in FIG. 3, and natural language input received via the NLU input path.

As described in detail below, the server (210) and the knowledge engine (250) process queries through use of one or more machine learning models, hereinafter MLMs, to extract or store content in one or more KGs, e.g., $KG_1$ (264A) and $KG_2$ (264B), stored in the knowledge base (260). The ontological structures are dynamically subject to input processing. More specifically, the knowledge engine (250) and associated tools (252), (254), (256), and (258) discover new data fields, content and associated data relationships. This discovery may be within or across ontological structures. Similarly, this discovery may be driven by express or inherent content relationships. The ML manager (258) functions as a tool, or in one embodiment, an API within the knowledge engine (250), and is used to create, link, and/or modify an associated ontological structure. As further described below, ML models are generated, created, or modified specific to a particular knowledge domain. The ML models are created to extract entities and relationships from unstructured data. These models are specifically created to understand a particular domain of knowledge (e.g., biographical information, stock market, astronomy, etc.).

The server (210) may be the IBM Watson® system available from International Business Machines Corporation of Armonk, N.Y., which is augmented with the mechanisms of the illustrative embodiments described hereafter. As shown herein, the server (210) receives input content (202) which is processed by the knowledge engine (250) that in turn identifies a corpora and an associated ontological structure in the knowledge base (260).

To process probability assessment and mapping, the server (210) utilizes an information handling system in the form of the knowledge engine (250) and associated tools (252)-(258) to support NLP and spatial ontology measurement. Though shown as being embodied in or integrated with the server (210), the information handling system may be implemented in a separate computing system (e.g., 290) that is connected across the network (205) to the server (210). Wherever embodied, the knowledge engine (250) supports and enables natural language processing to identify query context and discover context characteristic data, and supports and enables one or more ML models and corresponding ML algorithms to dynamically build spatial inter-corpora ontology to identify inherent object relationships.

The ML manager (258) is shown operatively coupled to an ML model library (240) shown herein with a plurality of machine learning models, MLMs, including $MLM_0$ (242), $MLM_1$, (244), and $MLM_N$ (246), each corresponding to an associated corpora, $C_1$ (262A), $C_2$ (262B) and $C_N$ (not shown, but described above). Each MLM, (242), (244), and (246) functions to manage data, including store data in an associated ontology, shown and described herein as the KG. More specifically, as understood, the KG is a structured ontology and does not merely store data. The knowledge engine (250) extracts data and one or more data relationships from corpora content, creates an entry for the extracted data and data relationship(s), and stores the data and data relationship(s) in the KG entry. In one embodiment, data in the KG is stored or represented in a node and a relationship between two data elements is represented as an edge connecting two nodes. It is understood that each KG organizes and provides structure to large quantities of data. A KG may be a single ontology, or in one embodiment, a KG or a KG container may comprise a plurality of KGs that are linked together to demonstrate their relationship or association. Although only three MLMs (i.e., $MLM_0$ $MLM_1$, and $MLM_N$) are shown, the quantity of MLMs shown and described should not be considered limiting. It is understood that in one embodiment the MLM is an algorithm employed or adapted to support the object relationships across one or more ontologies. Although shown local to the server (210), tools (252), (254), (256), and (258) may collectively or individually be embedded in memory (214).

Each corpora has an associated ontology and MLM. It is understood in the art that the corpora is a collection of texts, with the texts comprising a plurality of objects. In one embodiment, the objects are the content within the texts and include, but is not limited to, grammatical components, parts of speech, etc. The organization manager (252) functions to identify corpora objects and to organize them with respect to an associated ontology based on object characteristic data. In one embodiment, the corpora may be directed at technical data with products, associated product identifiers, product functionality description, etc. The organization manager (252) is operatively coupled to the ML manager (258) to facilitate creation or amendment of the associated ontology. In one embodiment, the organization manager (252) identifies and classifies context with respect to the ontology, and any structural modifications to the ontology are supervised and executed by the ML manager (258). It is understood that the corpora may be dynamic and subject to expansion or contraction, and the associated ontology may be amended to reflect changes to the corpora. In one embodiment, the ML manager (258) may dynamically amend the associated ontology responsive to changes to the corpora. Accordingly, the ML manager (258) is directed at managing the structure of the ontology, and the organization manager (252) is directed at managing and organizing corpora objects responsive to the ontology.

In addition to managing the associated ontological structures within the corpus, the organization manager (252) functions to identify contextual and structural relationships across the corpora. As described above, the structure of the corpora is captured in one or more ontologies. At the same time, objects within the corpora are understood to have their own characteristics and associated taxonomy. The organization manager (252) applies the objects to the corpora ontologies to form associations of the objects to the ontologies. These associations are within the corpora, or in one embodiment across the corpus. The inter-corpora associations are directed at the probability of the object association. The ML manager (258) forms a probabilistic model (270) of one or more inter-corpora associations of objects. This model is referred to as a spatial ontology (270), e.g. probabilistic model, and is directed at all content across the corpus. The spatial ontology (270) includes express and inherent relationships of objects across the corpus. Accordingly, the organization manager (252) functions to organize content and the ML manager (258) functions to form the spatial ontology (270) of the corpus content.

It is understood that queries may be presented to the knowledge engine. The queries may be structured and presented responsive to the structure of the associated ontology. Similarly, the queries may be unstructured. The queries may also be presented in a natural language format and may be subject to natural language processing (NLP). Received queries that are unstructured or subject to NLP are processed with respect to the structure of the associated ontology. The query manager (254) functions to receive and process queries. More specifically, if the query is received in NLP format, the query is forwarded to the query manager (254), which supports NLP to identify the parts of speech and context, and discover context characteristic data. Accordingly, the query manager (254) functions to receive structured and unstructured content and to apply the received content to the ontological structures organized and formed by the organization manager (252).

The query manager (254) interfaces with the organization manager (252) to submit characteristics and associated query data to the taxonomy. Based on the textual format and characteristic data of the query, the query manager (254) utilizes the spatial ontology to identify a corpora for the query. More specifically, application of the query content to the spatial ontology generates an initial probability of the relationship of the query content to the identified corpora. In one embodiment, two or more corpora may be identified as related with each corpora having a different probability value, with the query manager selecting one of the corpora based on the probability value. The query manager (254) submits the query content to the selected corpora and receives an initial response with an initial probability. In one embodiment, the initial probability directly correlates with a confidence level of the response as related to the submitted query. The query manager (254) leverages the initial probability against the spatial ontology (270). More specifically, the query manager (254) applies the content to the spatial ontology (270) to form an adjusted probability and an adjusted response.

The director (256), shown herein operatively coupled to the query manager (254), functions to assess the response and corresponding accuracy. The director (256) assesses accuracy of the responses by evaluating their respective values, e.g. an evaluation of the initial probability value with respect to the adjusted probability value. A response to the query is generated and returned by the query manager (254). The query manager (254) selects a response that directly correlates to one of the probability values. In one embodiment, the selection is the content directly correlated with the high probability value. A response is selected and returned based on the assessment and comparison of the corpora ontology and the spatial ontology. Accordingly, as shown herein, the response is generated based on statistical processing of relationship data.

It is understood that relationships among content within the corpora may be express or inherent. As relationships among content are developed or identified, the associated ontological structures are subject to modification. The ML manager (258) functions to respond to the dynamic characteristics of objects, and more specifically object relationships. The ML manager (258) dynamically builds the spatial inter-corpora ontology (270) for object content. The ontology (270) is based on expressly defined content relationships, and inherent content relationships. As an object in one of the corpora referenced in the ontology is subject to modification, the ML manager (258) dynamically optimizes the ontology (270) to reflect the modification. Similarly, as a new relationship associated with an object referenced in the ontology (270) is expressly or inherently suggested, the ML manager (258) dynamically optimizes the ontology (270). In an example, the inherent relationship may be directed at products and product resolution, inherent identification of related products based on behavior. Accordingly, the dynamic optimization of the ontology (270) together with the managers and director (252), (254), (256), and (258) create a system that leverages statistical processing to converge on human perception, behavior, and understanding.

As shown and described herein, the MLM library (240) is operatively coupled to the server (210) and contains a plurality of MLMs to support the dynamic characteristics of corpora content and content relationships. One or more of the MLMs may be dynamic and trained to adapt to new entities and relationships. In addition to dynamic modification of the associated ontology, the ML manager (258) dynamically modifies the associated MLM. In one embodiment, the identified modification may be an expansion of the associated data set to include an additional field. Similarly, in one embodiment, the ML manager (258) may ascertain that the modification is synchronic or diachronic, and use this classification as an element to oversee the modification. In one embodiment, the modification of an MLM may result in creation of a new MLM, or an amended or new spatial ontology (270). Accordingly, the MLM library (240) may expand subject to the dynamic modification of content and associated content relationships.

Types of information handling systems that can utilize system (210) range from small handheld devices, such as a handheld computer/mobile telephone (280) to large mainframe systems, such as a mainframe computer (282). Examples of a handheld computer (280) include personal digital assistants (PDAs), personal entertainment devices, such as MP4 players, portable televisions, and compact disc players. Other examples of information handling systems include pen or tablet computer (284), laptop or notebook computer (286), personal computer system (288) and server (290). As shown, the various information handling systems can be networked together using computer network (205). Types of computer network (205) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (290) utilizes nonvolatile data store (290a), and mainframe computer (282) utilizes nonvolatile data store (282a). The nonvolatile data store (282a) can be a component that is external to the various information handling systems or can be internal to one of the information handling systems.

An information handling system may take many forms, some of which are shown in FIG. 2. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
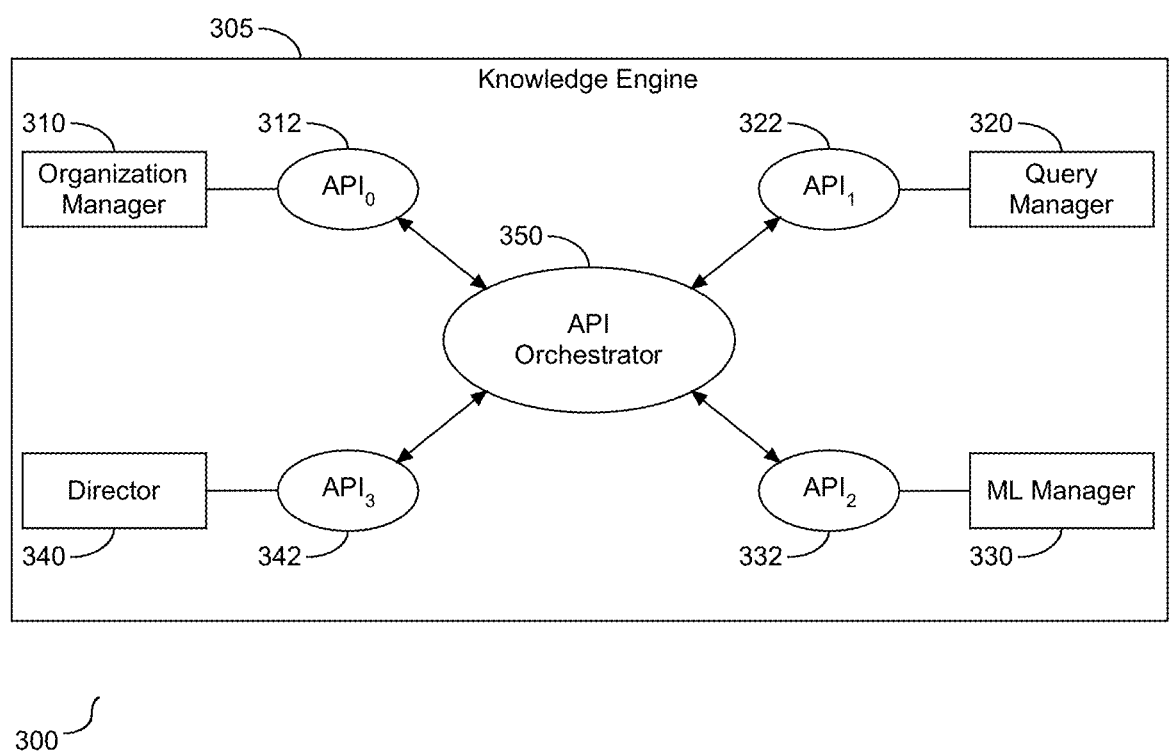
FIG. 3 depicts a block diagram illustrating the processing tools shown in FIG. 2 and their associated APIs.

An Application Program Interface (API) is understood in the art as a software intermediary between two or more applications. With respect content and relationship identification processing shown and described in FIG. 2, one or more APIs may be utilized to support one or more of the tools (252)-(258) and their associated functionality. Referring to FIG. 3, a block diagram (300) is provided illustrating the processing tools and their associated APIs. As shown, a plurality of tools are embedded within the knowledge engine (305), with the tools including the organization manager (310) associated with $API_0$ (312), the query manager (320) associated with $API_1$ (322), the machine learning manager (330) associated with $API_2$ (332), and the director (340) associated with $API_3$ (342). Each of the APIs may be implemented in one or more languages and interface specifications. $API_0$ (312) supports the functionality of the organization manager (252) including structural representation of content and content relationships; $API_1$ (322) supports the functionality of the query manager (254) including query processing; $API_2$ (332) supports the ML manager (258) including oversight of the spatial ontology and ML model creation, update and deletion; and $API_3$ (342) supports the functionality of the director (256) including confidence level assessment and response accuracy determination. As shown, each of the APIs (312), (322), (332), and (342) are operatively coupled to an API orchestrator (350), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 4:
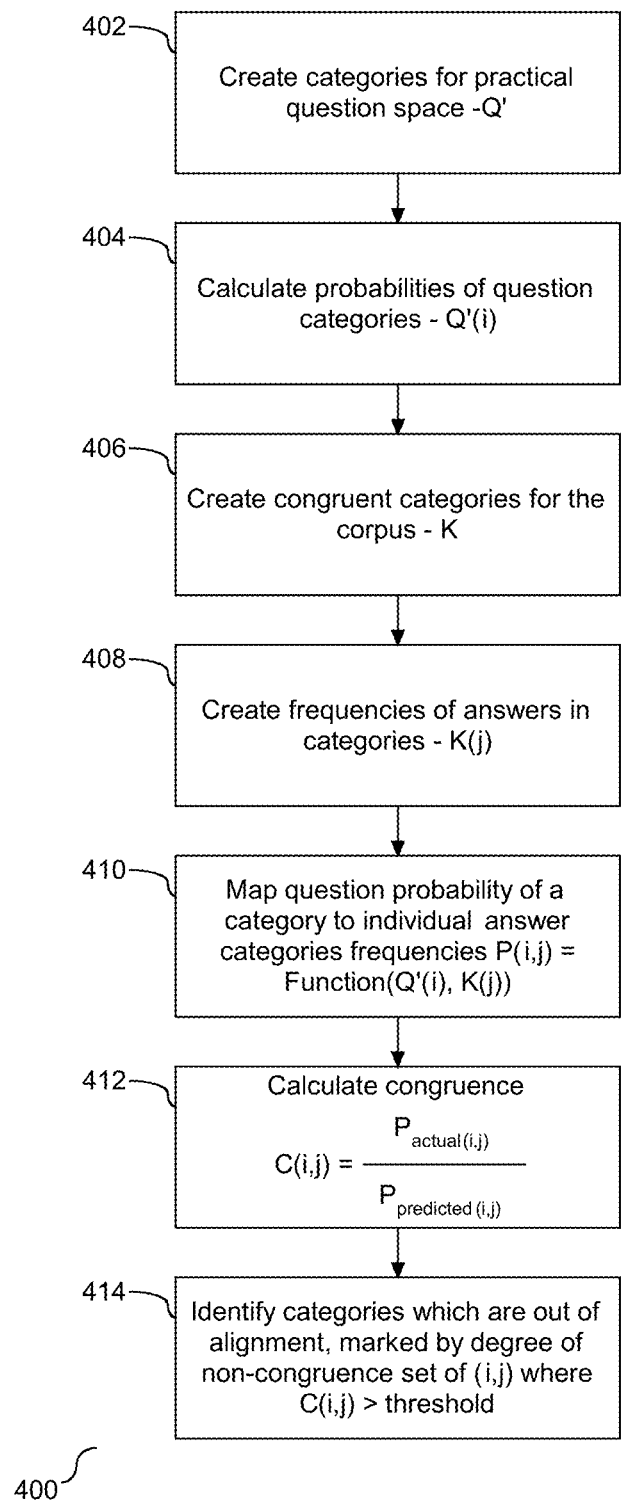
FIG. 4 depicts a flow chart illustrating a process for identifying content gaps.

Referring to FIG. 4, a flow chart (400) is provided to illustrate a process for identifying content gaps. The details of the process shown and described leverage a plurality of repositories of operational data and knowledge. It is understood that the quantity and characteristics of the repositories and operational data and knowledge should not be considered limiting. The variable S represents a support system where work items arrive and are tracked. The support system, also known as a support ticket system, creates tickets for issues, which are assigned to an entity for resolution. The support system creates question-answer pairs, Q-A pairs, with incoming work being viewed as a question and resolutions being viewed as answers. It is understood that within the support system there is a subset of the question space, Q', that will be further described below.

The variable E represents an employment system where subject attributes are tracked and permissions are managed. It is understood that subjects who work in the support system have certain attributes, such as skills, experience level, etc. These attributes are important to ascertain or define to support segmentation of question space Q' into sub-categories so that Q' does not need to be considered holistically.

The variable K represents a knowledge base where articles are stored, and as shown and described herein represents the corpus under investigation. It is understood that answer space, A, is present within the knowledge base, K. It is further understood that within the knowledge base, K, there is a subset of the answer space, A' that aligns with the question space Q'. In one embodiment, answer space A' contains practical answers for question space Q'. The goal of the process described herein is to maximize alignment of question space Q' with answer space A'.

The variable T represents a taxonomy system created to resolve challenges in joining support system S, employment system E, and the knowledge base K. It is understood in the art that systems S and E, and the knowledge base K, may be created individually and their structure data may not align with common taxonomy or vocabularies. To resolve concerns with alignment, natural language processing (NLP) and machine learning (ML) techniques are used to create a synthetic taxonomy of attributes out of identified features of support tickets, knowledge articles, and employment systems to augment features which are present.

One or more categories for a practical question space, Q', are created (402). The created question space is divided into categories to support analysis of the created space, e.g. Q'. In one embodiment, a size parameter is utilized for the categories in the division to provide support and management of analysis. With respect to the repositories described herein, the categories created at step (402) represent a concept found in existing information systems, e.g. S, E, and K. In one embodiment, the aspect of creating categories entails leveraging the information system to identify cross-system attributes, e.g. attributes that have meaning in the identified information systems. For each of the attributes created at step (402), probabilities of question categories, Q'(i), are calculated (404), where i represents an attribute. With respect to the probability assessment, a data set is created for the identified attribute. For example, the identified attribute may be product, and within the product category specific products, represented below as values. The following is an example data set:

TABLE 1

| Attribute$_0$ | Count | Frequency |
|---|---|---|
| Value$_0$ | 12391 | 11.1238% |
| Value$_1$ | 8516 | 7.6728% |
| Value$_2$ | 4475 | 3.8869% |
| Value$_3$ | 0 | 0.0000% |

Congruent categories for the knowledge base, K, are created (406). It is understood that joining different enterprise systems is challenging, as different systems cannot be expected to have the same attributes and value. The aspect of creating congruent categories is directed at creating common taxonomy values for the taxonomy system, T. The variable T represents a taxonomy system where values for data attributes are stored. Examples of the data attributes may include, but are not limited to, product name, platform, versions, topics, editions, industries, and document types. Thereafter, the knowledge base, K, is leveraged for creating frequencies of answers in categories (408), K(j). The frequency creation at step (408) includes an assessment of the probability calculation shown and described at step (404) as applied to the knowledge base, K. Following step (408), the question probability of a category is mapped to individual answer category frequencies (410), e.g. P(i,j)=Function (Q'(i), K(j)), where P is the probability, Q' is the question space, K is the knowledge base, i is a category in the practical question space, and j is a congruent category in the knowledge base. The mapping at step (410) takes observed frequencies in S and creates predictions of what should be available in K.

Figure 5:
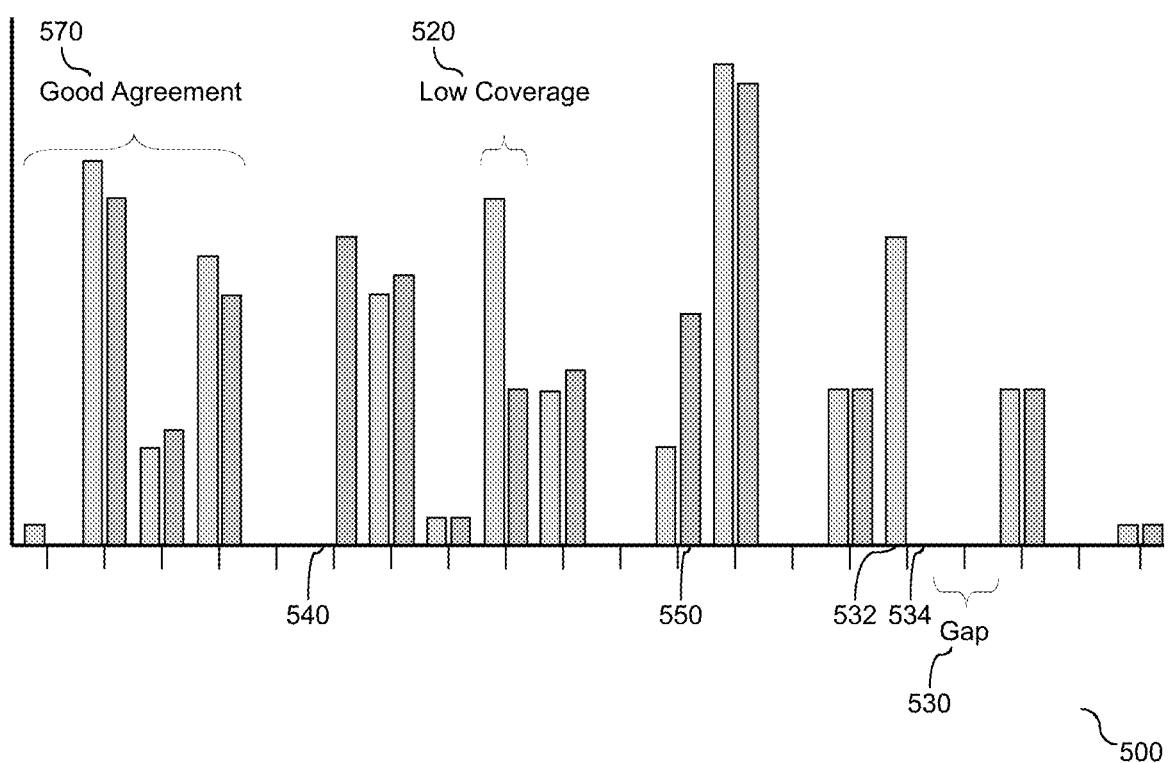
FIG. 5 depicts a graph to visually illustrate the mapping at step (410).

Referring to FIG. 5, a graph (500) is provided to visually illustrate the mapping at step (410). As shown, there are four areas of concern, including area (570) where the mapping shows the question space in agreement with the knowledge base, area (520) wherein the mapping shows low coverage, e.g. minimal data available, area (530) which demonstrates a gap between the question space and the knowledge base, e.g. only one of areas has data, and areas (540) and (550) which represents over-represented categories. Accordingly, depending on the data being assessed through the probability mapping, areas of interest may be identified, including one or more gaps being the question space the knowledge base.

Using the probability mapping conducted at step (410), and illustrated in FIG. 5, areas where the frequency of answers in a category has a significant difference from a predicted frequency are areas that require attention. For example, the gap (530) demonstrates a category (532) and documentation related to the category (534). In this example, the activity (532) is populated, but the corresponding documentation (534) is under-populated. It is this difference, e.g. between (532) and (534), that is graphically depicted as the gap (530). Specifically, the category (534) is under-represented by content in the knowledge base. A mathematical and logical assessment is conducted to calculate the congruence (412) between the corresponding activities and categories that were the subject of the probability mapping. The assessment is represented by: $(C_{i,j}) = P_{actual}(i,j)/P_{predicted}(i,j)$, where C represents the congruence, i represents the categories in the question space, and j represents a corresponding category in the knowledge base.

The content gap is defined by under-represented categories. Using the congruence assessed at step (412), one or more categories that are out of alignment are identified as a set of (i,j) where the assessed congruence, C(i,j) is greater than a threshold value, (414). The threshold is set with a machine learning (ML) algorithm to balance efficient consumption, backlog, and velocity. It is understood that the threshold value is a configurable component. The ML creates a data model that joins two separate enterprise computer systems with different architectures, creates a unified synthetic taxonomy, and conducts a mapping of congruent categories.

As shown and described in FIGS. 1-5, systems and processes are provided to support locating of gaps in the knowledge bases and effectively closing the identified gaps instead of creating duplicate or near-duplicate content. Frequencies of activities are applied to probabilistically predict the existence and location of the gaps. Embodiments may also be in the form of a computer program device for use with an intelligent computer platform to support and enable NLP and ML model application.

With references to FIG. 6, a block diagram (600) is provided illustrating an example of a computer system/server (602), hereinafter referred to as a host (602) in communication with a cloud based support system, to implement the system and processes described above with respect to FIGS. 1-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
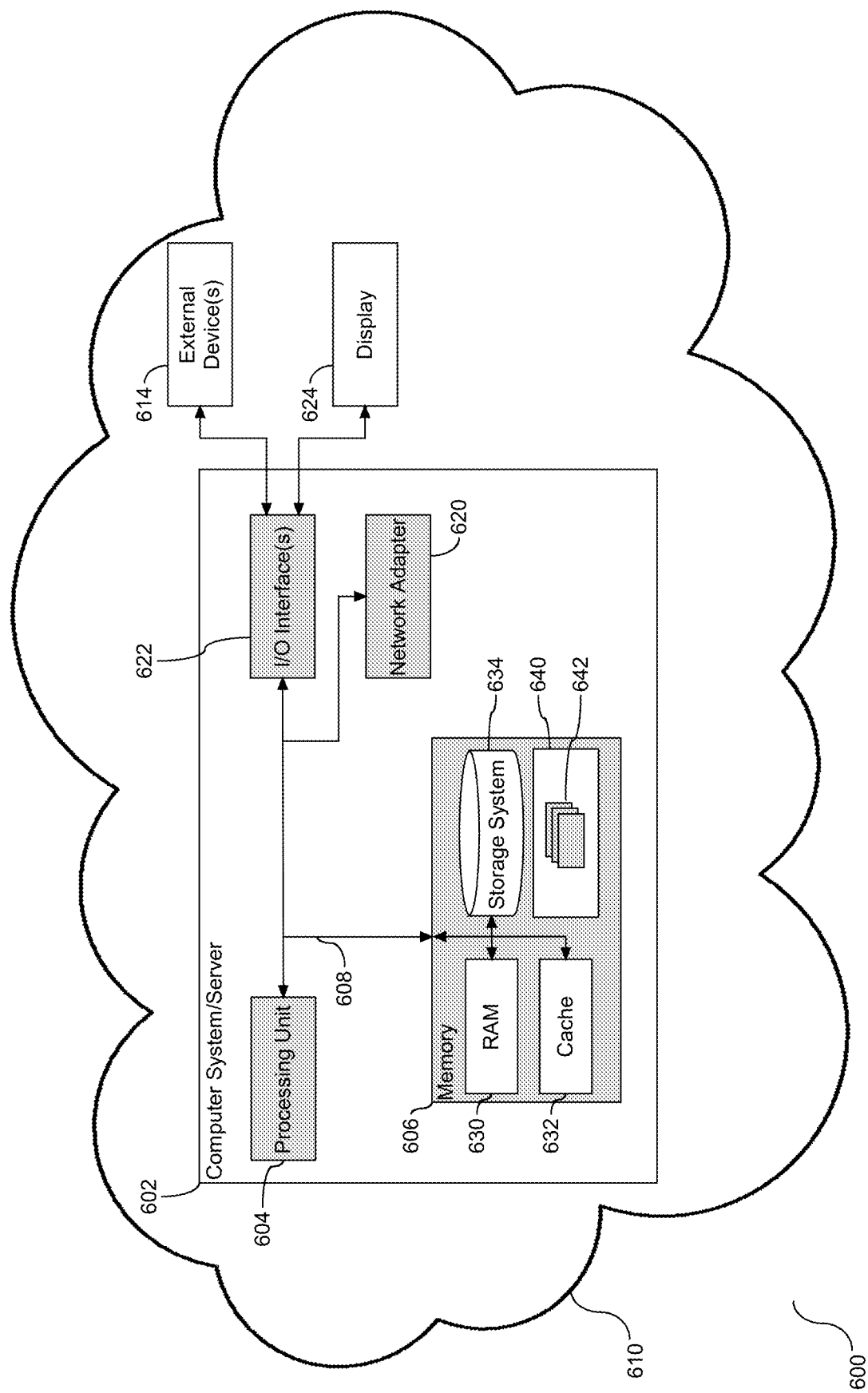
FIG. 6 is a block diagram depicting an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments of the adversarial training and dynamic classification model evolution. For example, the set of program modules (642) may include the modules configured as the tools (252)-(258) described in FIG. 2.

Host (602) may also communicate with one or more external devices (614), such as a keyboard, a pointing device, a sensory input device, a sensory output device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
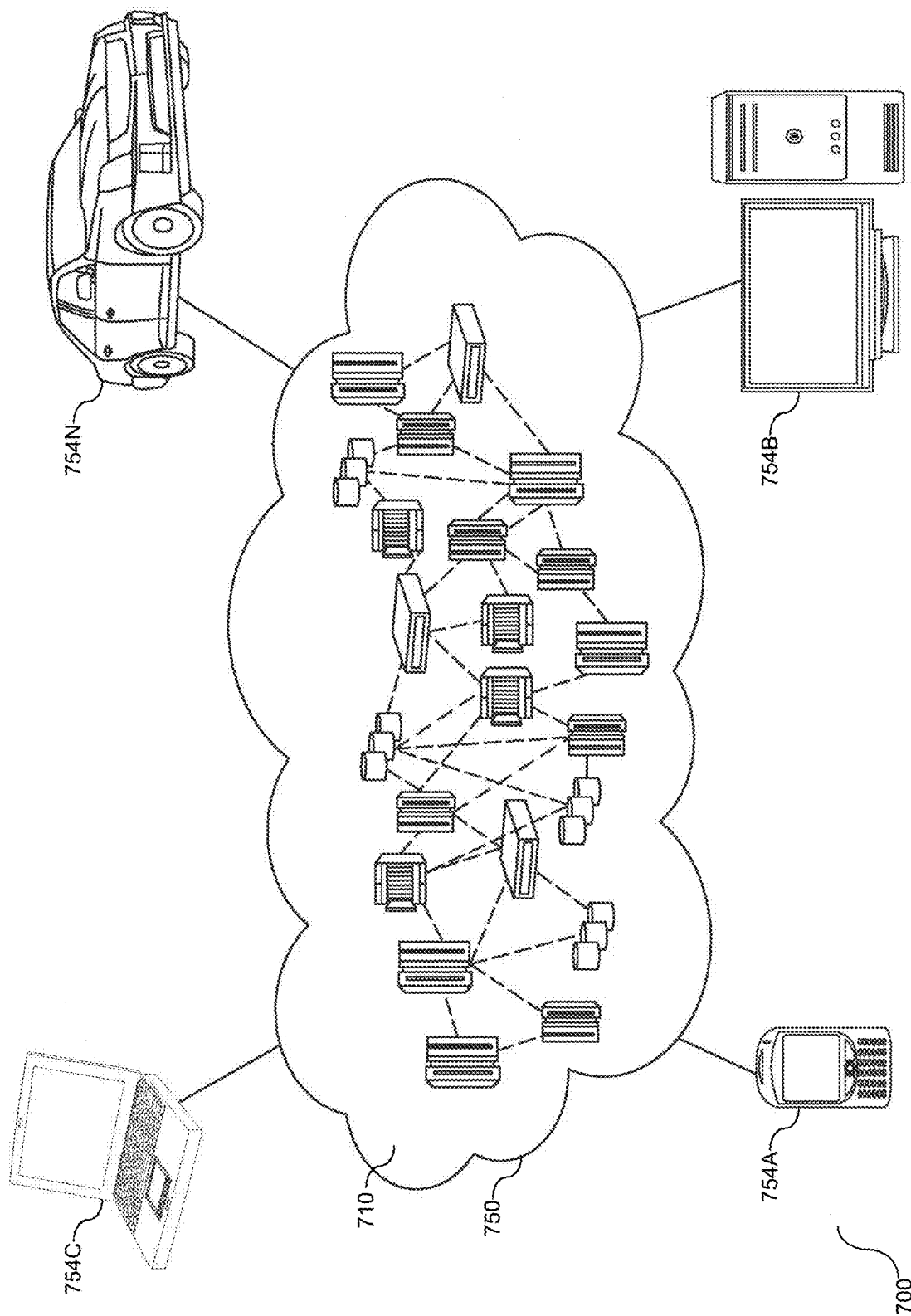
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
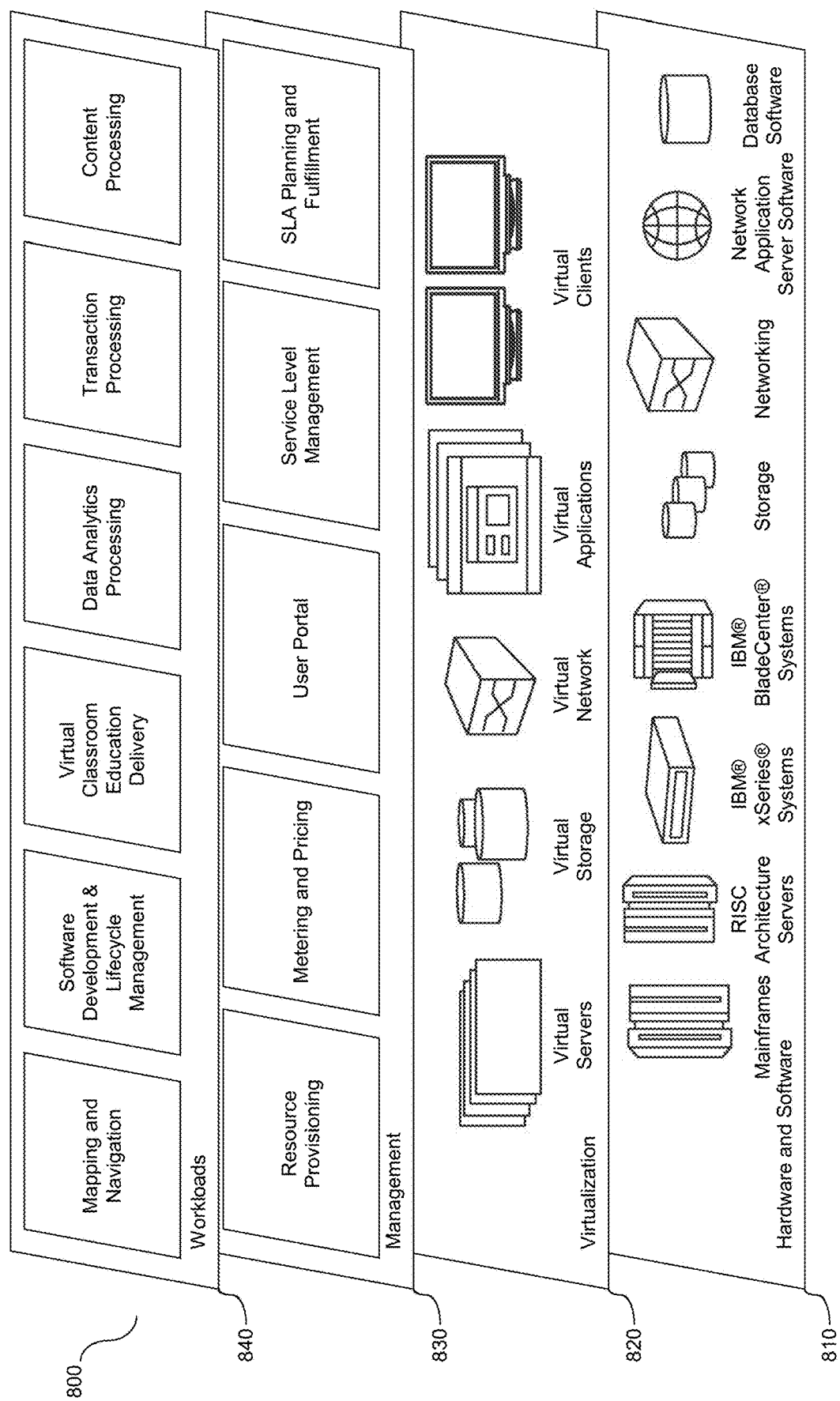
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and content processing.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product are operative to improve the functionality and operation of information retrieval by directing activity, and in one embodiment authoring activity, towards identified gaps in corpora of knowledge.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments of the invention have been described herein for purposes of illustration, various modifications may be made without departing from the spirit and scope of the invention. In particular, the natural language processing may be carried out by different computing platforms or across multiple devices. Furthermore, the data storage and/or corpus may be localized, remote, or spread across multiple systems. Accordingly, the scope of protection of this invention is limited only by the following claims and their equivalents.

What is claimed is:

1. A system comprising:
    a processing unit operatively coupled to memory;
    an artificial intelligence platform in communication with the processing unit and memory; and
    a knowledge engine operatively coupled to the processing unit, the knowledge engine to assess probability and generate a map based on the assessment, including:
        an organization manager configured to:
            for corpora having respective pluralities of objects, organize the objects into a plurality of taxonomies, including organize the respective plurality of objects of each corpus of the corpora into an associated taxonomy based on object characteristic data; and
            analyze the corpora according to the associated taxonomies, the analysis including formation of an inter-corpora ontology comprising one or more inter-corpora associations of the respective objects;
        a query manager operatively coupled to the organization manager, the query manager configured to:
            receive and process a query and associated query content, including leverage the inter-corpora ontology to identify, from the plurality of taxonomies, a taxonomy associated with the query content;
            submit the query to the corpus associated with the identified taxonomy;
            receive an initial response with an initial probability proportional to a frequency of the initial response in the corpus associated with the identified taxonomy; and
            apply the query content to the inter-corpora ontology, the application to form an adjusted probability and an adjusted response; and
        a director operatively coupled to the query manager, the director configured to assess confidence of accuracy of a response to the query based on evaluation of the initial probability value and the adjusted probability value; and
        the query manager to return a response, the response directly correlated to the assessed confidence conducted by the director, wherein the response includes the initial response or the adjusted response.

2. The system of claim 1, wherein the knowledge engine further comprises a natural language (NL) manager, the NL manager configured to identify the associated query content and discover context characteristic data.

3. The system of claim 1, wherein the knowledge engine further comprises a machine learning (ML) model, the ML model configured to dynamically build the inter-corpora ontology for object content, wherein the inter-corpora ontology identifies inherent relationships between the objects across the corpora.

4. The system of claim 3, wherein the knowledge engine is configured to dynamically optimize the ML model in response to amendment of one or more of the plurality of objects.

5. The system of claim 3, wherein the identified inherent relationships reveal inherent content relationships.

6. A computer program product comprising:
    a computer readable storage medium having computer readable program code embodied therewith, the program code being executable by a processor to assess probability and generate a map based on the assessment, including program code executable by the processor to:
    for corpora having respective pluralities of objects, organize the objects into a plurality of taxonomies, including organize the respective plurality of objects of each corpus of the corpora into an associated taxonomy based on object characteristic data;
    analyze the corpora according to the associated taxonomies, the analysis including formation of an inter-corpora ontology comprising one or more inter-corpora associations of the respective objects;
    receive and process a query and associated query content, including leverage the inter-corpora ontology to identify, from the plurality of taxonomies, a taxonomy associated with the query content;
    submit the query to the corpus associated with the identified taxonomy;
    receive an initial response with an initial probability proportional to a frequency of the initial response in the corpus associated with the identified taxonomy;
    apply the query content to the inter-corpora ontology, the application to form an adjusted probability and an adjusted response;
    assess confidence of accuracy of a response to the query based on evaluation of the initial probability value and the adjusted probability value; and
    return a response, the response directly correlated to the assessed confidence, wherein the response includes the initial response or the adjusted response.

7. The computer program product of claim 6, further comprising program code executable by the processor to support natural language processing, including program code executable by the processor to identify the associated query content and discover context characteristic data.

8. The computer program product of claim 6, wherein the program product further comprises a machine learning (ML) model configured to dynamically build the inter-corpora ontology for object content, wherein the inter-corpora ontology identifies inherent relationships between the objects across the corpora.

9. The computer program product of claim 8, further comprising program code executable by the processor to dynamically optimize the ML model in response to amendment of one or more of the plurality of objects.

10. The computer program product of claim 8, wherein the identified-relationships reveal inherent content relationships.

11. A method comprising:
    for corpora having respective pluralities of objects, organizing the objects into a plurality of taxonomies, including organize the respective plurality of objects of each corpus of the corpora into an associated taxonomy based on object characteristic data;
    analyzing the corpora according to the associated taxonomies, the analysis including forming an inter-corpora ontology comprising one or more inter-corpora associations of the respective objects;
    receiving and processing a query and associated query content, including leveraging the inter-corpora ontology to identify, from the plurality of taxonomies, a taxonomy associated with the query content;
    submitting the query to the corpus associated with the identified taxonomy;
    receiving an initial response with an initial probability proportional to a frequency of the initial response in the corpus associated with the identified taxonomy;
    applying the query content to the inter-corpora ontology, the application to form an adjusted probability and an adjusted response;
    assessing confidence of accuracy of a response to the query based on evaluation of the initial probability value and the adjusted probability value; and
    returning a response from the confidence assessment, the response directly correlated to the assessed confidence, wherein the response includes the initial response or the adjusted response.

12. The method of claim 11, further comprising supporting natural language processing, including identifying the associated query content and discovering context characteristic data.

13. The method of claim 11, further comprises utilizing a machine learning (ML) model and dynamically building the inter-corpora ontology for object content, wherein the inter-corpora ontology identifies inherent relationships between the objects across the corpora.

14. The method of claim 13, further comprising dynamically optimizing the ML model in response to amendment of one or more of the plurality of objects.

15. The method of claim 13, wherein the identified inherent relationships reveal inherent content relationships.

* * * * *